(12) United States Patent
Drakonakis et al.

(10) Patent No.: US 12,163,257 B2
(45) Date of Patent: Dec. 10, 2024

(54) PROCESS FOR MAKING HYBRID (FIBER-NANOFIBER) TEXTILES THROUGH EFFICIENT FIBER-TO-NANOFIBER BONDS COMPRISING NOVEL EFFECTIVE LOAD-TRANSFER MECHANISMS

(71) Applicant: Advanced Materials Design & Manufacturing Limited, Nicosia (CY)

(72) Inventors: Vasileios Drakonakis, Nicosia (CY); Katerina Sofocleous, Nicosia (CY)

(73) Assignee: Advanced Materials Design & Manufacturing Limited, Nicosia (CY)

( * ) Notice: Subject to any disclaimer, the term of this patent is extended or adjusted under 35 U.S.C. 154(b) by 1030 days.

(21) Appl. No.: 16/464,527

(22) PCT Filed: Nov. 28, 2017

(86) PCT No.: PCT/EP2017/080675
§ 371 (c)(1),
(2) Date: May 28, 2019

(87) PCT Pub. No.: WO2018/099910
PCT Pub. Date: Jun. 7, 2018

(65) Prior Publication Data
US 2019/0376210 A1    Dec. 12, 2019

Related U.S. Application Data

(60) Provisional application No. 62/427,429, filed on Nov. 29, 2016.

(51) Int. Cl.
*D01F 1/10*    (2006.01)
*B32B 5/26*    (2006.01)
(Continued)

(52) U.S. Cl.
CPC .............. *D01F 1/10* (2013.01); *B32B 5/26* (2013.01); *C08J 5/042* (2013.01); *C08J 5/046* (2013.01); *C08J 5/06* (2013.01); *D01D 5/0007* (2013.01)

(58) Field of Classification Search
CPC ..... C08J 5/005; C08J 5/046; C08J 5/06; C08J 5/042; B82Y 30/00; B82Y 40/00;
(Continued)

(56) References Cited

U.S. PATENT DOCUMENTS

2011/0177332 A1    7/2011 Park et al.
2014/0162063 A1    6/2014 Dzenis

FOREIGN PATENT DOCUMENTS

| CN | 104972719 A | 10/2015 |
|---|---|---|
| JP | 2013504182 A | 10/2013 |
| JP | 2015528068 A | 9/2015 |

OTHER PUBLICATIONS

Gao et al., Preparation, morphology, and mechanical properties of carbon nanotube anchored polymer nanofiber composite, Composites Science and Technology, vol. 92 (2014). (Year: 2014).*
(Continued)

*Primary Examiner* — Camie S Thompson
(74) *Attorney, Agent, or Firm* — Price Heneveld LLP

(57) ABSTRACT

The nanoparticles-reinforced nanofibers, which include the nanoparticle reinforcements (individually or as agglomerates) as protrusions with an area of size between 30 nm and 8 microns, which are used as anchors between the polymer nanofibers and the polymer matrix system of the final multilayer composite.

12 Claims, 2 Drawing Sheets

(51) Int. Cl.
*C08J 5/04* (2006.01)
*C08J 5/06* (2006.01)
*D01D 5/00* (2006.01)

(58) Field of Classification Search
CPC .... D04H 1/413; D04H 1/43838; D04H 1/728;
D01F 1/10; D01D 5/0007; D01D 5/0015;
D01D 5/00; C04B 2235/5288; B32B
7/12; B32B 2250/02; B32B 2250/03;
B32B 2250/04; B32B 2250/20; B32B
2262/0207; B32B 2262/0223; B32B
2262/0238; B32B 2262/024; B32B
2262/0253; B32B 2262/0261; B32B
2262/0284; B32B 5/022; B32B 5/26;
B32B 5/00; B32B 5/024; B32B 5/026;
B32B 5/06; B32B 5/12; B32B 2250/40;
B32B 2260/046; B32B 2262/02; B32B
2262/0269; B32B 2262/101; B32B
2262/106; B32B 2307/302; B32B
2307/54; B32B 2307/706; B32B
2307/7265; B32B 2307/732; B32B
2437/00; Y10T 428/24994; Y10T 428/25;
Y10T 428/2913; Y10T 428/2998; B01D
2239/025; B01D 2239/0258; B01D
2239/0618; B01D 2239/0654; B01D
2239/1233; B01D 2239/0407; B01D
2239/0668; B01D 2239/0661
USPC ...... 428/300.1, 364, 323, 407; 977/753, 762
See application file for complete search history.

(56) References Cited

OTHER PUBLICATIONS

Naebe et al., Carbon Nanotubes Reinforced Electrospun Polymer Nanofibres, Nanofibers, Published Feb. 1, 2010.*
European Patent Office, International Search Report, Jan. 19, 2018.

* cited by examiner

PROCESS FOR MAKING HYBRID (FIBER-NANOFIBER) TEXTILES THROUGH EFFICIENT FIBER-TO-NANOFIBER BONDS COMPRISING NOVEL EFFECTIVE LOAD-TRANSFER MECHANISMS

CROSS-REFERENCE TO RELATED APPLICATIONS

This application claims priority to U.S. Provisional Application No. 62/427,429, filed Nov. 29, 2016, the disclosures of which are incorporated herein by reference in its entirety for all purposes.

DESCRIPTION

Technical Field of the Invention

The present invention relates to the treatment, modification, and enhancement of carbon or other fiber type textiles for the polymer composites industry.

Background of the Invention

The use of fiber-reinforced polymer composite multilayer structures in the industrial fields of transportation, sports, energy, and others increases from year to year with high demand. For instance, the Compound Annual Growth Rate (CAGR) in the global carbon fiber composites market has been predicted from 7 to 8% from 2012 to 2018. Additionally, more recent studies include predictions of CAGR up to 12% from 2015 to 2020 with estimations of the global market to exceed 12 billion US Dollars. This high demand of composite structures requires more and more novel technologies that can drastically enhance composite materials properties in order to fulfill the needs of the market and the new applications. In the applications of multilayer composites within the aforementioned industrial fields, there is a continuous need for lighter and at the same time stronger structures. Composite structures suffer from delamination, the crack propagation within the interlayer; the region between two consecutive laminas. Within the existing literature, strength is usually approached through reinforcements within the interlayer that eventually enhance the fracture toughness performance (Mode I, and Mode II tests) as well as impact resistance (Compression After Impact—CAI). In the present invention, it is shown how the interlayer reinforcement can be utilized in order to enhance the tensile strength of the material as well, resulting in increased weight savings for particular structural components due to less layers of fabric use in order to acquire similar level of strength when compared with currently used fabric laminas.

The use of polymer, preferably thermoplastic, fibers in various formations (short fibers, continuous fibers, non-woven fabrics etc.) has been intensively used for the reinforcement of the interlayer with various aims of polymer composite materials improvement.

EP2926987A1 reports the creation of a polymer-nanoparticle-enhanced-interlayer, which can be in the form of polymeric fibers (diameter of the fibers is reported from 1 to 100 microns), where the nanoparticles are embedded within the polymeric fibers. In this invention polymer fibers are either heated and melt-bonded or stitched or directly spun onto the entire surface of the fiber bed (main fabric). Nanoparticles are utilized within the polymer micro-fibers to increase the properties (ex. stiffness) of the polymer (fibrous or not) interlayer. This invention aims to increase the properties of the final composite and more particularly Mode I, Mode II, and CAI.

Toward similar final composite properties improvement, the invention EP1473132A2 has proposed a stack of multiaxial unidirectional layers associated with webs of thermoplastic micro-fibers fibers (diameter of the fibers is reported from 1 to 100 microns). The web connection between the unidirectional layers is achieved by means of heated rollers, which provide a continuous weld on the entire surface of the fabric. Moreover, WO2007015706A1 reports the creation of a polymer continuous fiber enhanced interlayer of similar-size thermoplastic fibers, which through heating, melt-bonding or mechanical bonding onto the entire surface of the fiber bed achieves similar improvements in Mode I, Mode II, and CAI.

Another invention, EP1125728A1, introduces the use of a fiber-web within one or more interlayers of the multilayer structure, which makes it possible to improve mechanical properties of the final composite. This invention is about the improvement of a composite material by using short-fiber non-woven fabric, which is attached to the actual fiber bed. This attachment is mainly performed through a needle punching process, and could also be performed through high pressure bonding, heating, or hot-melting processes.

Furthermore, US2012015167A1 uses similar-size (0.5 to 70 microns) thermoplastic micro-fibers for the interlayer reinforcement. In this invention, thermoplastic fibers are bonded onto the surfaces of the carbon fiber bed either in the entire surface or in spots. In this invention, compared to other relevant inventions of the literature reported in the present document, the lamina thickness is maintained with very low variation, achieving the preservation of final composite carbon fiber volume fraction at 60%, which is an aviation requirement. Through this invention, stitching or other wefts are not present within the lamina, achieving higher properties in terms of fracture toughness and CAI. Slight increase in the tensile strength is also achieved due to the elimination of stitching and wefts and thus, maintaining high carbon fiber volume fraction despite the presence of the interlayer. Similarly, US2012202004A1 presents the development of a stack of bonding two unidirectional (UD) carbon fiber layers through a web of thermoplastic micro-fibers that are welded with the UD layers in spaced or discontinued weld points, aiming to take advantage of higher carbon fiber content within the lamina by eliminating use of stitching and/or knitting wefts, and thus achieving better mechanical properties (Fracture Toughness and CAI). Under the same perspective of eliminating use of stitching and/or knitting wefts, inventions US2012015135A1 and US2013108823A1 report new intermediate materials in the form of a ribbon or a tape for the manufacturing of composite parts. The former uses non-woven thermoplastic micro-fabrics and the latter thermoplastic veils out of similar-sized micro-fibers. US2012015135A1 describes the processing of a unidirectional strand of carbon fiber filaments, which is followed by the attachment of a thermoplastic nonwoven micro-fabric through roll to roll processing and consecutive step of thermo-compression, attaching the non-woven micro-fabric to the entire surface of the UD strand.

Additionally, WO2006121961A1 introduces an interlayer in the form of a veil made out of thermoplastic micro-fibers, which are further reinforced with nanoparticles or particles in order to localize particle concentration and increase particular properties of the final composite. In this invention, the placement of the micro-fibrous interlayer is performed during the lay-up process followed by the curing process in order to produce an enhanced composite in terms of fracture toughness and CAI performance.

Moreover, invention WO2015011549A1 provides an innovative fiber reinforced polymer composition to improve particularly Mode II fracture toughness through the introduction of a toughening interlayer which is attached to the fiber bed through a third barrier layer made out of high-aspect-ratio material. This barrier layer may be out of carbon nanotube or other nanofibers and it aims to attach the actual toughening interlayer to the fiber bed.

Another invention US2003180514A1 utilizes thermoplastic fiber filaments, which are aligned, distinctly spaced apart from each other and at different directions from lamina to lamina, in order to connect consecutive layers of fabric. The actual connection is achieved through fusion of thermoplastic fibers.

Other inventors with aim to improve different properties other than mechanical have also used the introduction of thermoplastic micro-fibers. US2011287246A1 for example utilizes thermoplastic microfibers reinforced with ferrous nanoparticles within prepregs in order to enhance conductivity. Introduction of a thermoplastic micro-fiber interlayer is described in JP-04-292634A, WO94/016003, and JP-H02-32843A.

Also, U.S. Pat. No. 6,503,856B1 aims to improve the conductivity of carbon fiber sheet materials by enhancing them with a melt blow thermoplastic web of relatively large fibers (above 15 microns) onto one or more surfaces of the carbon fiber network.

In addition, self-healing of composites through concentric core-shell thermoplastic fibers introduction to the interlayer has been presented in WO2014120321A2. The core-shell fibers are loaded with liquid healing agent and are produced by co-electrospinning.

Another invention of polymer fiber to polymer nanofiber bonding is presented in US20150211175 through electrospinning and then fusion bonding between the fiber and the nanofiber in order to create polymer fiber yarns.

Finally, KR20110045715A uses electrospun membranes of nanofabrics as reinforcement to industrial fabrics in order to make them water proof. Membranes are bonded to the industrial fabrics through UV activated adhesives onto the entire surface of the industrial fabric.

Prior work by the inventors [V. M. Drakonakis, *CNT Reinforced Epoxy Foamed and Electrospun NanoFiber Interlayer Systems for Manufacturing Lighter and Stronger Featherweight™ Composites*, Ph.D Dissertation, University of Texas at Arlington, (2012)|Drakonakis V. M.; Velisaris C. N.; and J. C. Seferis; C. C. Doumanidis; "*Feather-Inspired Carbon Fiber Reinforced Polymers with Nanofibrous Fractal Interlayer*", Polymer Composites Journal, DOI: 10.1002/pc.23168, Published online August (2014)|Drakonakis V. M.; Doumanidis C. C.; Velisaris C. N.; Kanelopoulos N.; Seferis J. C.; *Nanobridization in Carbon Fiber Polymeric Matrix Nanocomposite Systems*, The 18th International Conference on Composite Materials, Proceedings, Jeju Island, S. Korea, (August 2011)] has shown that a non-bonded random fractal structure combining carbon fibers, electrospun nanofibers, and carbon nanotubes within the lamina can significantly increase the strength of the material. The bending stiffness and fracture toughness of the resulting fractal composites improved significantly. Specifically for Mode II fracture, improvement from conventional CFRP samples to those with plain CA-electrospun nanofibers interlayer was around 115%. With the addition of carbon nanotubes within the electrospun nanofibers, further improvement was observed for the final composite totaling around 180% compared to conventional CFRP control samples. This strength enhancement is attributed to surface protrusion lumps, which do not appear on plain electrospun nanofibers, and act as anchors with matrix resin.

Existing CFRP textiles and/or prepregs may be reinforced with several fibrous, nanofibrous or other materials within the interlayer in order to increase the fracture toughness of the material and reduce delamination [V. Kostopoulos; A. Masouras; A. Baltopoulos; A. Vavouliotis; G. Sotiriadis; L. Pambaguian; "*A critical review of nanotechnologies for composite aerospace structures*", Springer, DOI: 10.1007/s12567-016-0123-7, (2016)]. However, tensile strength of the CFRP composite either remains at similar levels if the volume fraction of the carbon fibers is maintained or reduces if the volume fraction of the carbon fibers is decreased. This happens because mechanical load is transferred among crossing carbon components via friction. Solid material joints between these components could help improve the transport properties. Towards such bonded networks, ultrasonic bonding between electrospun fibers within a random fractal membrane and a foil thermoplastic matrix at a laboratory scale process yielded strong joints and led to increased strength of the autogenous composite in dynamic mechanical analysis (DMA) tests [A. Christofidou, Z. Viskadourakis, C. C. Doumanidis, "*Structural, Magnetic and Dynamic Mechanical Analysis of Magnetic Nanocomposite Foils by Polymer Ultrasonic Welding*", J. on Nano Research Vol. 10, p. 39-47, April 2010]. This was attributed to confinement effects at the internal fiber-matrix interfaces over the large membrane surface, rather than any reinforcement material strength per se.

The aforementioned inventions utilize mostly thermoplastic micro-fibers as a toughening mechanism of the interlayer or as a form of interlayer that keeps the main fiber bed clean of stitching and weft materials in order to maximize its capacity of load transferring while material performs. The proposed invention introduces a new technology for enhancing the material performance even more at a level where the interlayer reinforcement participates in the load transferring mechanisms in most of load types (tension, compression, bending, etc.)

SUMMARY OF THE INVENTION

In the present invention a novel interlayer is introduced to multilayer fiber reinforced polymer composites able to enhance the strength properties of the composite without changing the initially desired fiber volume fraction, regardless the fiber type (carbon, glass, aramid etc.) and/or the layer fabric knit (woven, UD, etc.).

In the present invention, an interlayer, which is made out of polymer nanofibers reinforced with nanoparticles, is introduced in order to enhance the material performance through the formation of a fractal structure from lamina to lamina. This nanofibrous interlayer consists of non-woven, continuous nanofibers and not microfibers, which is the case in most works and inventions found in current literature. More particularly, the diameter of the nanofibers within the interlayer ranges from 30 to 300 nanometers.

The reinforced nanofibers are created in a separate process and may be spun directly on to the main fiber-bed or not. The preferred process to achieve the characteristics of the nanofabric of the present invention is highly accurate electrospinning. The use of the particular process results in a non-woven continuous-fiber nanofabric with high integrity and low deviation in nanofiber diameter and nanofabric thickness. The low dimensional deviation contributes to the formation of a repetitive fractal structure from lamina to lamina. However, other techniques of creating a nanofibrous interlayer with low dimensional deviation may be explored for achieving similar strength-improvement results.

The nanofibers are attached to the fiber bed within a custom made ultrasonic welding configuration and through continuous welding lines at distinct spaces from each other. Welding is performed in a clean and continuous manner compatible with production speeds of carbon fabric manufacturing lines (UD or woven fabrics).

Other bonding techniques of continuous line welding may be utilized, however, the developed ultrasonic welding machine creates bonding suitable for effective load transfer within the material. The benefit of ultrasonic welding compared to other fabric-interlayer bonding techniques is its simplicity, the easiness in application, and the creation of further load-transfer mechanisms (apart from the actual fibers), which form a fractal architecture from lamina to lamina.

The continuous nanofibers are processed and collected in a separate roll of non-woven fabric. The roll is further processed through ultrasonic welding with the main fiber-bed. The nanofabric may be bonded to one or both surfaces of the fiber-bed. The overall target is to increase the performance of the lamina and ultimately of the laminated composite rather than the performance of the fiber or the fabric itself.

Nanoparticles in this invention are used as a reinforcement of the nanofibers in order to improve the mechanical, but not limited to, properties of the entire lamina complementing the formation of the fractal structure (actually a scalable structure) that transfers mechanical loading throughout the lamina much more effectively. During the spinning process, nanoparticles result, individually or as agglomerates, as protrusions to the nanofiber surface, which serve as anchors of the nanofibers with the polymer matrix system of the multilayer composite contributing to the overall load transfer within the final multilayer composite.

Through the present invention the thickness of the lamina is controlled helping maintaining the stiffness of the material. Thickness control of the nanofabric (10 to 25 microns) is achieved at a deviation of 1 micron. Controlling lamina thickness is the key to a dramatic increase of lamina performance.

The fractal lamina structure is shaped out of the fiber-nanofiber-nanoparticle members and includes the fiber bed. As a single body, the fractal lamina structure is able to transfer load more efficiently throughout the lamina structure increasing, not only the expected properties such as fracture toughness (Mode I, II) or CAI, but also tensile strength for the final polymer interlayered composite.

Welding of the nanofabric with the main fiber-bed is performed through continuous welding lines and not in spots or in the entire surface of the fiber-bed. The welding lines direction varies from interlayer to interlayer and is preselected during the material design phase, as it has been observed that directional welding offers an anisotropic character within the plane of the interlayer affecting the performance of the final composite.

This invention is not limited to width.

In another embodiment of the present invention, nanofibers can be processed in the form of a tow/filament, which can then be further sewed within the main fiber bed, eliminating other kinds of stitching and wefts.

The sewed nanofibers are further welded in the touching pints only with the carbon fiber bed through the developed ultrasonic welding technique in order to create another form of fractal structure that can effectively transfer load through the material.

In another embodiment of the present invention, carbon fiber textiles sandwiched within thermoplastic reinforced-nanofiber scaffolds or sewed with polymer nanofiber filaments can be used as thermoplastic prepregs without further impregnation.

Finally, in another embodiment of the present invention, fiber textiles sandwiched within thermoplastic reinforced-nanofiber scaffolds or sewed with polymer nanofiber filaments can be carbonized through a continuous pyrolytic process.

DETAILED DESCRIPTION OF THE INVENTION

The present invention includes the effective introduction of nanoparticle-reinforced nanofibers as a nano-enabling interlayer to a multilayer fiber reinforced polymer composite forming particular fractal architectures from lamina to lamina.

Figure 1:
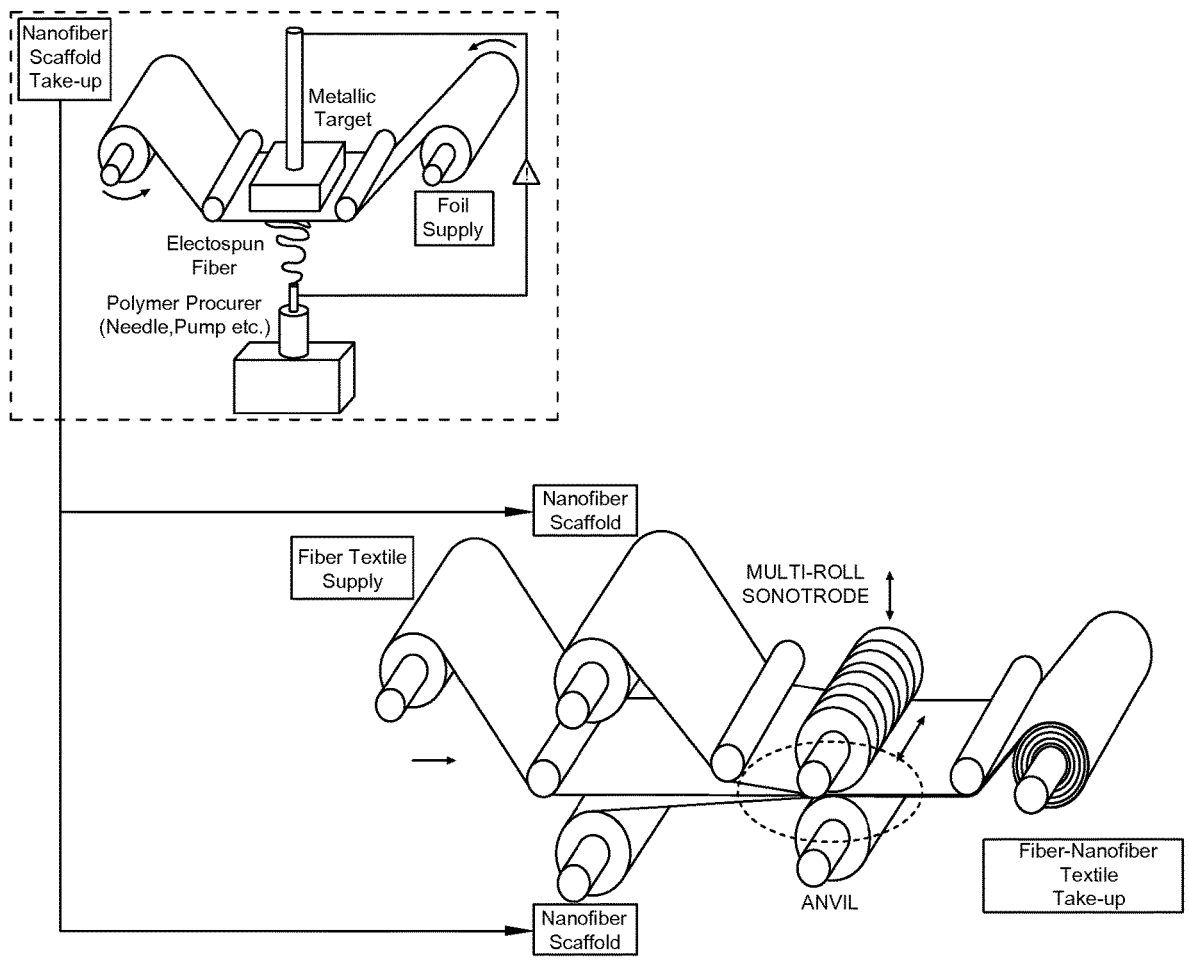
FIG. 1: A schematic of nanofibers electrospinning in-line with multi-roll ultrasonic welding for creating fiber-nanofiber effective consoloidation. The dashed box illustrates the electrospinning process, showing the polymer precursor and the placement of nanofibers on supply foil upon applying current. Below the dashed box the ultrasonic welding process is illustrated as the consolidation process of fibers and nanofibers with solid joints.

Key characteristic of the proposed interlayer is its separate manufacturing in a continuous spinning process (preferably electrospinning) creating a roll of continuous nanofiber scaffold (nanofabric). The electrospinning process is preferable in order to control nanofiber diameter size and nanofabric thickness through applied voltage (20 to 90 kV), process speed (0.1 to several meters/min), and polymer solution viscosity (10 to 350 cP). In an industrial application, the nanofiber spinning process may be in-line with the consolidation process of the continuous nanofabric with the main fiber bed (FIG. 1). Other spinning techniques of creating the nanofibrous interlayer, which can control nanofiber diameter and nanofabric thickness in the ranges of the present invention, may be utilized as well. Nanofiber diameter ranges from 30 to 300 nm, preferably 80 to 200 nm. The nanofabric thickness ranges from 2 to 50 μm, preferably 4 to 12 μm.

The use of the particular nanofabric with reinforced nanofibers, controlling thickness of the nanofabric and diameter of the nanofibers, is very important for the invention in order to apply the nanofabric as an effective interlayer to polymer composite multilayer structures. The benefit of the nano-scaled fibers (30 to 300 nm) compared to micro-scaled ones, described in the aforementioned applications within the background section, is the enhanced capacity of essentially introducing more fibers (nanofibers) within the interlayer, allowing increased nano-reinforcement (through the actual nanofibers as well as the reinforcing nanoparticles) and thus increased nano-enabling surface between polymer nanofibers and the matrix system, offering higher interface and increased number fiber-to-nanofiber bonds, resulting in higher strength for the final composite.

The polymer nanofibers, depending on the application, may be formed by various polymeric precursors such as polyamide 6, nylon 6 (PA6), poly(vinylidenefluoride) (PVDF), poly(vinylidenfluorid-co-hexafluoropropylen) (PVDF-HFP), poly(vinylidenefluoride-co-chlorotrifluoroethylene) (PVDF-CTFE), Polysulfone (PSU), Polyethersulfone (PES), Larithane AL 286 (PUR), Tecophilic HP-60D-60, gelatin (A), chitosan, collagen (calf), cellulose acetate (CAC), (L,D)-polylactic acid (PLA), polycaprolactone (PCL), Polyvinylalcohol (PVA), Polyacrylonitrile (PAN), Polyvinylpyrrolidone (PVP), Polystyrene (PS), poly (methylmethacrylate) (PMMA), polyacrylic acid (PAA), poly(styrene-co-maleic anhydride) (PSMA), polypropylene melt (PP). The curing conditions of the final composite must allow for co-existence of polymer nanofibers and polymer matrix as a system, inhibiting polymer nanofibers from collapsing.

The reinforcing nanoparticles can consist of various materials as well. Depending on the application of the final composite, the type of nanoparticle may contribute to the improvement of the desired property such as strength, electrical and thermal conductivity, water resistance, flammability etc. Different types of nanoparticles may be utilized in combinations either by forming nanofibers with more than one type of nanoparticles as reinforcement (example: nanofibers reinforced with carbon nanotubes and aluminum oxide nanowires within the nanofiber) or by forming scaffolds with nanofibers of different and more than one reinforcements (example: scaffold with 40% of nanofibers reinforced with carbon nanotubes and 60% of nanofibers reinforced with aluminum oxide nanoparticles). Nanoparticles may be of various materials such as oxides, metals, ceramics, carbon, graphene, etc. and in various geometrical shapes such as tubes, wires, spheres, platelets, clays, particles, etc.

Figure 3:
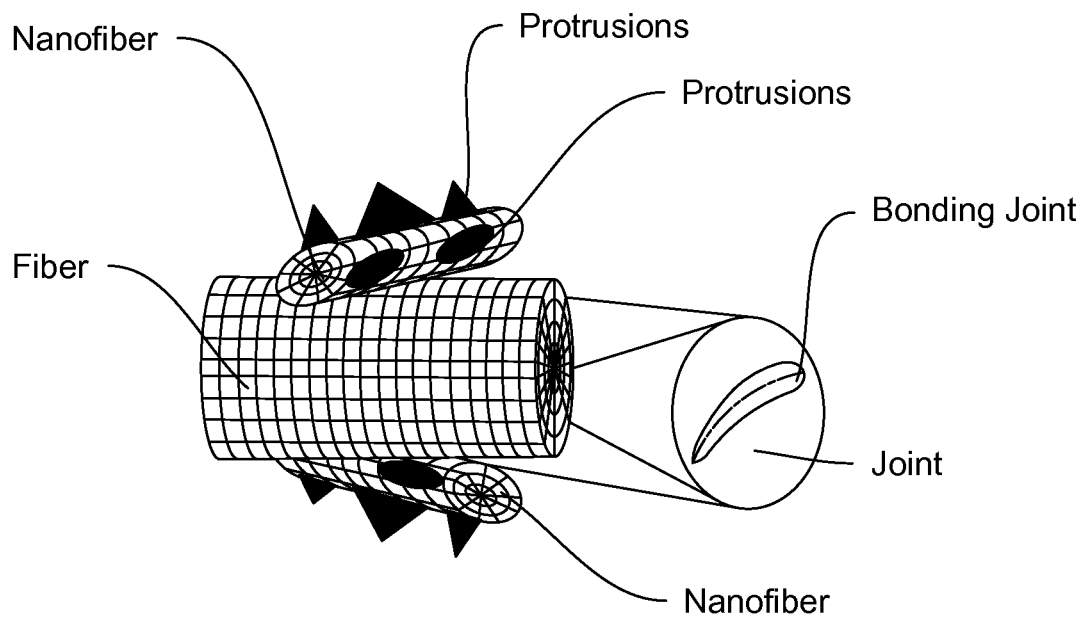
FIG. 3: Effective joint between fiber filament and nanoparticle-reinforced nanofiber.

When nanotubes of different distributions (diameter from 2 to 45 nm, length from 200 nm to 2 microns, and number of grapheme walls from 1 to 35) or other nano-reinforcements in the form of tubes or wires reinforce the nanofibers, it has been observed that depending on the formation process (electrospinning in this case) they create protrusions on the surface of nanofibers, which function as anchors with the polymer matrix system of the final composite (FIG. 3). Such nanoparticle-protrusions, individually or as agglomerates, lead to an anchoring mechanism/effect of nanofibers with the polymer matrix system, which further contributes to the material enhanced strength. When different types of nanoparticles are utilized as reinforcement to the nanofibers, lumps or dimples may result on the nanofiber surface, which can offer similar anchoring mechanisms with the polymer matrix system. The size of these anchors on the surface of nanofibers can be from 30 nm to 8 microns, preferably 400 nm to 1 micron.

The reinforced continuous nanofabric is then consolidated with the main fiber-bed. The nanofabric may be bonded to one or both surfaces of the fiber-bed. The process used for the consolidation of the nanofabric with the main fiber-bed is continuous ultrasonic welding. The continuous ultrasonic welding process for the nanofabric attachment to the fiber-bed is performed through a custom-made multi-roll ultrasonic welding configuration (FIG. 2).

Figure 2:
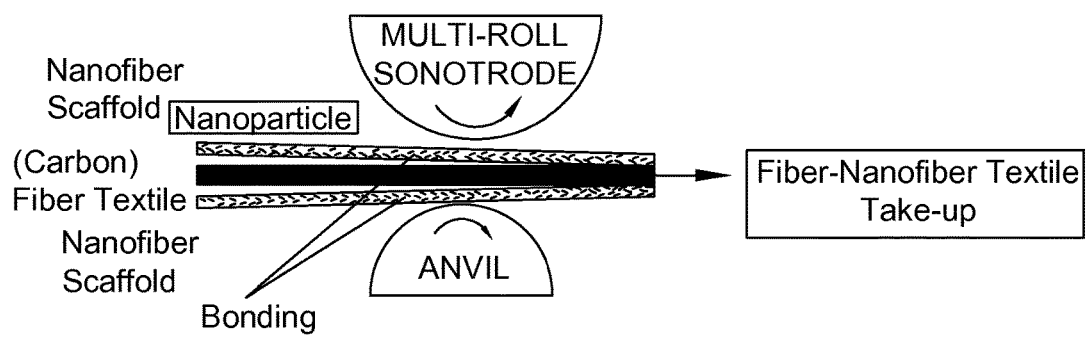
FIG. 2: A schematic of the sontorode-to-anvil cylindrical configuration of consolidating nano-fibrous with fibrous materials.

This multi-roll sewing seam polymer ultrasonic welding machine (Ultrasonic Welding can accommodate sonotrode rolls at any configuration) compresses the nonwoven nanofabric sandwiched fiber-bed between rotating cylindrical anvils and cylindrical roll sonotrodes, vibrated at certain ranges of frequency (10 to 80 kHz, preferably 18 to 25 kHz) at an amplitude of 5 to 20 μm (preferably ~10 μm) normally to the fiber-bed (FIG. 2).

Bonding is achieved through continuous welding lines at distinct spaces from each other (5 mm to 10 cm, preferably 5 to 20 mm). Thickness of welding lines can vary, but it cannot exceed 15 mm. Welding is performed in a clean and continuous manner compatible with production speeds of carbon fabric manufacturing lines (UD or woven fabrics) up to 25 meters/min.

The process of electrospinning (or other nanofiber spinning technique) together with the process of continuous ultrasonic welding is combined, in-line or not, in order to form reinforced (carbon fiber or other fiber type) textiles (and/or prepregs) with nano-particle reinforced nanofibers bonded on the textile surface(s) (to be placed in the interlayer in a multilayer structure) through the creation of effective joints (FIG. 3) (Due to continuous ultrasonic welding) between the reinforced nanofibers and the textile/prepreg fiber tows/filaments.

The robust, low-temperature, multi-material, high-speed, energy efficient, and low-cost processing by ultrasonic welding secures manufacturing scalability for industrial production, along with preservation of the special properties of the nanostructured elements, and material versatility in matrix-reinforcement conditions. Other techniques such as thermocompression (diffusion bonding), thermosonics, and then Physical Vapor Deposition of carbon around the intersections may be utilized for the consolidation of the reinforced nanofibers with the main fiber-bed resulting in the creation of similar effective bonding. The effective bonding between carbon fibers (or other fibers) and reinforced nanofibers as a result of the roll-to-roll ultrasonic welding process is introduced within multilayer composites structures, providing composite materials with improved delamination resistance and significantly increased tensile strength as a novel load transfer mechanism within the composite.

Numerous load transfer mechanisms (FIG. 3) are created during the ultrasonic welding process between the carbon fibers and the polymer nanofibers. Upon curing, these bonds, together with the inherited anchors on the nanofibers surface due to the reinforcing nanoparticles, are maintained within the matrix system offering an increased interface area due to the nano-sized fibers as well as the anchors, but most importantly allowing for load transfer not solely through the fibers of the fiber bed, but partially through the nanofibers as well.

Reinforced-nanofiber/carbon-fiber/Reinforced-nanofiber sandwich-laminas can be further impregnated with epoxy resin (controlling desired carbon fiber overall volume fraction) if desired by the composite manufacturer.

The fractal design is formed within the lamina level through the scaled geometry of the well-bonded fibers, nanofibers, and anchoring-nanoparticles from both sides of the lamina imitating the structure of feather (rachis-barb-barbule) that serves nature for millions of year so far. In a multilayer structure this fractal architecture is repetitive from lamina-to-lamina contributing to increased stiffness within the final composite. Tighter packing during lay-up and autoclaving of the fractal lamina allows for maintaining the volume fraction of the fiber of the fiber-bed.

The welding between the main fiber-bed and reinforced nanofiber interlayer is performed through continuous welding lines and not in spots or in the entire surface of the fiber-bed. The continuous welding lines between the nanofabric of the interlayer and the main fiber-bed form the load transfer mechanisms in the lamina level. The direction alteration of those welding lines within the interlayer offers load transfer toward certain directions. The understanding of interlayer anisotropy is given through a particular example: a panel with 8 unidirectional laminas is processed with all plies toward the same direction) (0°). The first and the eighth plies are welded with the nanofabric scaffolds along the direction of the main fabric)(0°, the second and the seventh are welded at +45°, the third and the sixth are welded at −45°, and the fourth and the fifth are welded at 90°. Numerous directional combinations can be achieved for the continuous welding lines. The welding lines direction is pre-selected during the composite material design phase.

Upon lay-up and curing of the reinforced-nanofiber/carbon-fiber/reinforced-nanofiber laminas into a multilayer structure, the resulting composite exhibits significantly increased tensile strength (up to 30% compared to conventional CFRP [Active Standard ASTM D3039/D3039M]) as well as in highly enhanced fracture toughness in Modes I & II (up to 50% and 300% for Mode I [Active Standard ASTM D5528] and II [Active Standard ASTM D7905/D7905M], respectively). Additionally, the effective joints (carbon fiber tow to electrospun fiber) have also been tested in fiber testing [Active Standard ASTM D3822/D3822M] presenting strength from 40 to 80 MPa depending on the nanofiber diameter and polymer type (Tested based on Active Standard ASTM D3822/D3822M). The above improvements may vary with a deviation of +/−10% when the welding lines direction varies.

EMBODIMENTS

In another embodiment of the present invention, nanofibers can be processed in the form of a tow/filament, which can then be further sewed within the main fiber bed, eliminating other kinds of stitching and wefts facilitating material handling and contributing to higher lamina performance.

Figure 4:
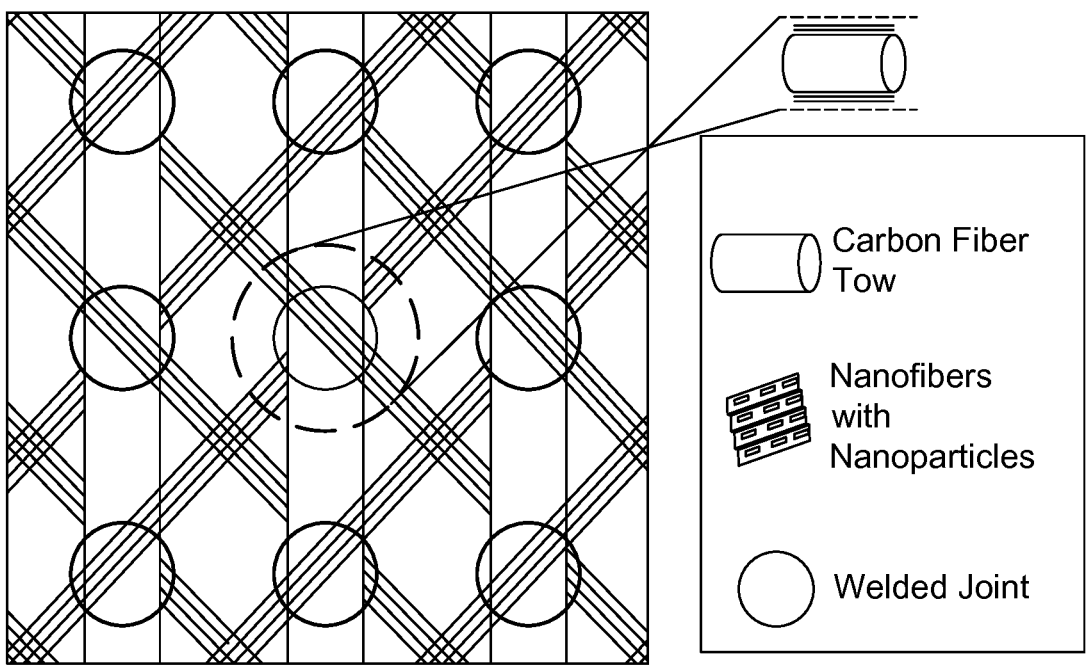
FIG. 4: Stitched and welded filaments of nanofibers on carbon fiber (or other fiber) fabric.

The sewed nanofibers are further welded in lines, forming bonds in the touching pints as mechanisms that can effectively transfer load through the material (FIG. 4).

Alternatively, in another embodiment carbon fiber textiles sandwiched within thermoplastic reinforced-nanofiber scaffolds can be used as thermoplastic prepregs without further impregnation. In this case the thickness of the scaffolds ranges from 50 to 150 μm. Furthermore, nanofibers have to be made out of thermoplastics with melting points below 200° C. in order to facilitate processing and manufacturing of thermoplastic prepregs.

In another embodiment, when the main fiber-bed is out of thermoplastic fibers, the Reinforced-nanofiber/thermoplastic-fabric/Reinforced-nanofiber sandwich-laminas may undergo through a pyrolytic process (Carbonization) due to their thermoplastic nature. To assure consistency of main fibers and carbonized reinforced nanofibers, pyrolytic processing of sandwiched laminas is conducted under tension in order to maintain macro-molecular orientation and limit relaxation and chain scission of the polymer precursor. For this purpose, the sandwiched textiles/laminas are processed in a tensioned roll setting suitable for scale-up to a roll-to-roll process. Within the roll-to-roll process, laminas or yarns are first oxidized at 230±30° C. for approximately 30 min, then they are placed for ~1 h in an inert (nitrogen) environment at 750±50° C. to be carbonized, and eventually they continue for ~1 h in an inert environment at 1200±100° C. to be graphitized. This scalable process lends itself to continuous roll-to-roll processing, in a flow-through oven with the carbonization process of reinforced nanofibers ultimately under similar conditions with pyrolysis of carbon fibers.

In particular, the present invention relates to

Nanoparticles-reinforced nanofibers, which include the nanoparticle reinforcements (individually or as agglomerates) as protrusions with an area of size between 30 nm and 8 microns, which are used as anchors between the polymer nanofibers and the polymer matrix system of the final multilayer composite.

The said nanoparticle-reinforced polymer nanofibers, which are reinforcing the interlayer region within two or more consecutive unidirectional fiber (carbon, aramid, glass, etc.) laminas of a multilayer polymer composite.

The said nanoparticle-reinforced polymer nanofibers, which may be of any combination of the nanoparticles and polymers listed as described above.

The said nanoparticle-reinforced polymer nanofibers, which are processed through electrospinning process or through any other process that can derive nanofibers of similar size, chemical state, and strength.

The said nanoparticle-reinforced polymer nanofibers, which present average diameter from 30 to 300 nm.

The said nanoparticle-reinforced polymer nanofibers, which are in the form of non-woven nanofabric with high integrity and low deviation (+/−1 micron) in nanofiber diameter and nanofabric thickness. The said nanoparticle-reinforced polymer nanofibers, which are welded, through ultrasonic welding process, onto one or both sides of one fiber lamina through continuous welding lines, with line width ranging from 1 mm to 25 mm, placed at distinct spaces from each other (5 mm to 10 cm) and at speeds compatible with production speeds of carbon fabric manufacturing lines (UD or woven fabrics). In particular bonds are created within the said nanoparticle-reinforced polymer nanofibers and the fibers (carbon, aramid, glass, polymer, etc.) of the main fiber-bed, which independently present strength up to 100 MPa. The bond is preferably created within the said nanoparticle-reinforced polymer nanofibers and the fibers (carbon, aramid, glass, polymer, etc.) of the main fiber-bed, which transfer load effectively contributing to the increase of the composite multilayer structure tensile strength up to 40%. Further, the bond that is preferably created within the said nanoparticle-reinforced polymer nanofibers and the fibers (carbon, aramid, glass, polymer, etc.) of the main fiber-bed, which form a repetitive fractal interconnected structure or architecture from lamina to lamina based on the size-scaling characteristics fiber, nanofiber, anchoring-nanoparticle. Further, a continuous process of creating the said nanoparticle-reinforced polymer nanofibers, and then, welding them onto the fiber-bed upper and/or lower surfaces through a roll-to-roll process.

The said nanoparticle-reinforced polymer nanofibers, which consist of nanoparticles that participate in load transfer as part of the repetitive feather-like fractal structure. The process of continuous welding between the said nanoparticle-reinforced polymer nanofibers, and the main fiber-bed at various directions within the unidirectional lamina plane.

The process of continuous welding between the said nanoparticle-reinforced polymer nanofibers, and the main fiber-bed at different directions from lamina to lamina, offering an anisotropic character within each interlayer region that positively affects the performance of the final multilayer composite.

The said nanoparticle-reinforced polymer nanofibers, which are in the form of filament of nanofibers.

The said nanoparticle-reinforced polymer nanofibers that can then be sewed within the main fiber bed, eliminating other kinds of stitching and wefts.

The said nanoparticle-reinforced polymer nanofibers, which are welded through a continuous welding process forming welding pints with the main fiber-bed, which create another form of fractal structure that can effectively transfer load through the material.

The said nanoparticle-reinforced polymer nanofibers, which can be used as thermoplastic prepregs without further impregnation.

The said nanoparticle-reinforced polymer nanofibers, which can be carbonized through a continuous pyrolytic process.

The said nanoparticle-reinforced polymer nanofibers bonded on one or both surfaces of a polymeric fiber-bed, which can then be carbonized as one sandwiched lamina through a continuous pyrolytic process.

A feather-like fractal structure created by the anchoring-nanoparticles, the said reinforced-nanofibers, and the fiber-bed.

The invention claimed is:

1. Nanoparticle-reinforced polymer nanofibers, comprising:
   nanoparticle reinforcements that extend as protrusions extending from a surface of the nanofibers;
   wherein a length of the protrusions on the surface of the nanofibers ranges from 400 nm to 1 µm;
   wherein the protrusions serve as anchors between the polymer nanofibers and a polymer matrix system of a multilayer fiber reinforced composite;
   wherein the nanoparticles include carbon nanotubes or carbon nanowires and other carbon nanoparticles different than the carbon nanotubes or carbon nanowires; and
   wherein the protrusions extend substantially orthogonally from the nanofibers.

2. The nanoparticle-reinforced polymer nanofibers according to claim 1, wherein the nanoparticle-reinforced polymer nanofibers include filament of nanofibers.

3. The nanoparticle-reinforced polymer nanofibers according to claim 1, wherein the nanoparticle-reinforced polymer nanofibers include a non-woven nanofabric having a deviation of +/−1 micron in nanofiber diameter and nanofabric thickness, and wherein the nanoparticle-reinforced polymer nanofibers are welded through continuous welding lines at distinct spaces from each other with a width ranging from 1 mm to 25 mm onto one or both sides of a one fiber lamina by an ultrasonic welding process.

4. The nanoparticle-reinforced polymer nanofibers according to claim 3, further comprising at least one of:
   bonds within the nanoparticle-reinforced polymer nanofibers and fibers of a main fiber-bed, wherein the fibers have a tensile strength of up to 100 MPa; and
   a bond within the nanoparticle-reinforced polymer nanofibers and fibers of a main fiber-bed, thereby resulting in a composite multilayer structure having a tensile strength of up to 40% greater than a multilayer structure without the bond; and
   a bond within the nanoparticle-reinforced polymer nanofibers and fibers of a main fiber-bed, forms a repetitive fractal interconnected structure from lamina to lamina.

5. The nanoparticle-reinforced polymer nanofibers according to claim 4, wherein the nanoparticle-reinforced polymer nanofibers includes an aramid.

6. The nanoparticle-reinforced polymer nanofibers according to claim 3, wherein the nanoparticles are configured to participate in load transfer as part of a repetitive fractal structure where the lamina is anchored from both sides of the lamina.

7. The nanoparticle-reinforced polymer nanofibers according to claim 1, wherein the nanoparticle-reinforced polymer nanofibers are include within a thermoplastic prepreg.

8. The nanoparticle-reinforced polymer nanofibers according to claim 1, wherein the nanoparticle-reinforced polymer nanofibers are carbonized through a continuous pyrolytic process.

9. The nanoparticle-reinforced polymer nanofibers according to claim 1, wherein the nanoparticle-reinforced polymer nanofibers are bonded on one or both surfaces of a polymeric fiber-bed, which are then carbonized as one sandwiched lamina through a continuous pyrolytic process.

10. Nanoparticle-reinforced polymer nanofibers, comprising:
    nanoparticle reinforcements that extend as protrusions extending substantially orthogonally from a surface of the nanofibers;
    wherein a size of the protrusions on the surface of the nanofibers ranges from 30 nm to 8 µm;
    wherein the protrusions serve as anchors between the polymer nanofibers and a polymer matrix system of a multilayer fiber reinforced composite;
    wherein the nanoparticles include carbon nanotubes or carbon nanowires and other carbon nanoparticles different than the carbon nanotubes or carbon nanowires; and
    wherein the nanoparticle-reinforced polymer nanofibers have a present average diameter from 30 nm to 300 nm.

11. A multilayer polymer composite, comprising:
    two or more consecutive unidirectional fiber laminas and nanoparticle-reinforced polymer nanofibers, the nanoparticle-reinforced polymer nanofibers comprising:
       nanoparticle reinforcements that extend as protrusions from a surface of the nanofibers;
       wherein the protrusions are configured to serve as anchors between the polymer nanofibers and a polymer matrix system of a multilayer fiber reinforced composite; and
       wherein the nanoparticles include nanotubes or nanowires;
    wherein the nanoparticle-reinforced polymer nanofibers are configured to reinforce an interlayer region within the fiber laminas.

12. A fractal structure, comprising:
    anchoring-nanoparticles;
    nanoparticle-reinforced polymer nanofibers, comprising:
       nanoparticle reinforcements that extend as protrusions from a surface of the nanofibers;
       wherein the protrusions are configured to serve as anchors between the polymer nanofibers and a polymer matrix system of a multilayer fiber reinforced composite; and
       wherein the nanoparticles include nanotubes or nanowires; and
    a fiber-bed;
    where a lamina is anchored from both sides of a lamina.

* * * * *